United States Patent
Canfield

(10) Patent No.: US 8,155,997 B2
(45) Date of Patent: Apr. 10, 2012

(54) METHODS AND SYSTEMS FOR PERFORMANCE TRACKING

(76) Inventor: David A. Canfield, Chicago, IL (US)

( * ) Notice: Subject to any disclaimer, the term of this patent is extended or adjusted under 35 U.S.C. 154(b) by 1668 days.

(21) Appl. No.: 10/504,668

(22) PCT Filed: Feb. 25, 2003

(86) PCT No.: PCT/US03/05860
§ 371 (c)(1),
(2), (4) Date: May 26, 2005

(87) PCT Pub. No.: WO03/075502
PCT Pub. Date: Sep. 12, 2003

(65) Prior Publication Data
US 2006/0041467 A1    Feb. 23, 2006

Related U.S. Application Data

(60) Provisional application No. 60/360,515, filed on Feb. 28, 2002.

(51) Int. Cl.
*G06F 17/30* (2006.01)
(52) U.S. Cl. .................................................. 705/7.38
(58) Field of Classification Search .................. 705/2–3, 705/11, 7.38
See application file for complete search history.

(56) References Cited

U.S. PATENT DOCUMENTS

| | | | |
|---|---|---|---|
| 5,749,372 A | 5/1998 | Allen et al. | |
| 5,966,695 A | 10/1999 | Melchione et al. | |
| 6,635,015 B2 * | 10/2003 | Sagel | 600/300 |
| 6,790,178 B1 * | 9/2004 | Mault et al. | 600/300 |
| 6,811,516 B1 * | 11/2004 | Dugan | 482/8 |
| 2002/0147641 A1 * | 10/2002 | Hickford et al. | 705/14 |
| 2002/0173999 A1 * | 11/2002 | Griffor et al. | 705/7 |

OTHER PUBLICATIONS

Sinclair "Performance measurement: a critical analysis of the literature with respect to total quality management", May 2003, European Centre for TQM, University of Bradford, pp. 1-24.*
Hansen et al A performance tracking methodology and design support model), Dec. 2000, IEEE, pp. 1-7.*
Russomagno (A formal sales development system with performance tracking lead to success), Sep. 2000, The Hearing Journal, vol. 53 vol. 9, pp. 1-3.*
"DailyTracker version 1.5 Track and graph things you do every day", http://www.reesley.com/dtracker.htm, May 16, 2005.

* cited by examiner

*Primary Examiner* — Romain Jeanty
(74) *Attorney, Agent, or Firm* — Greer, Burns & Crain, Ltd.

(57) ABSTRACT

Methods and systems consistent with the present invention provide a performance tracking tool that receives an identification of a data item (208), associates the data item with one of a group of tracking modes (210) that includes at least two of a LOGICAL mode, a SUM mode, and an AVERAGE mode.

47 Claims, 11 Drawing Sheets

FIG. 1
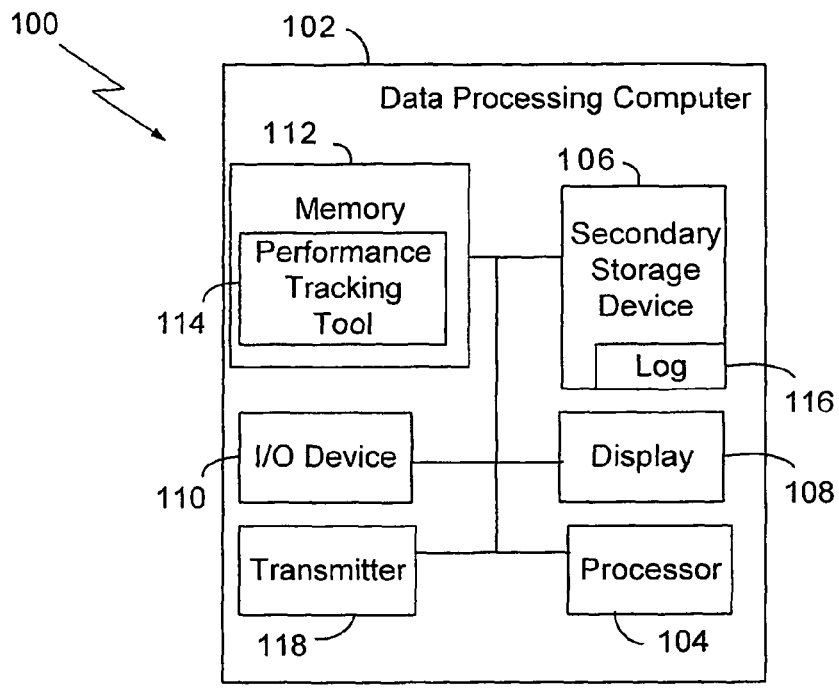
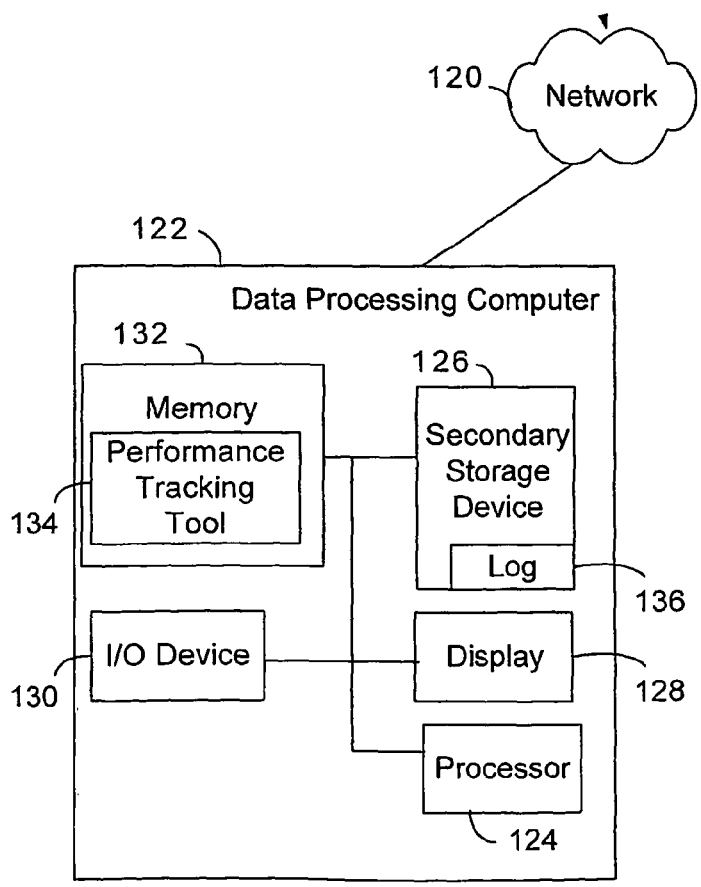

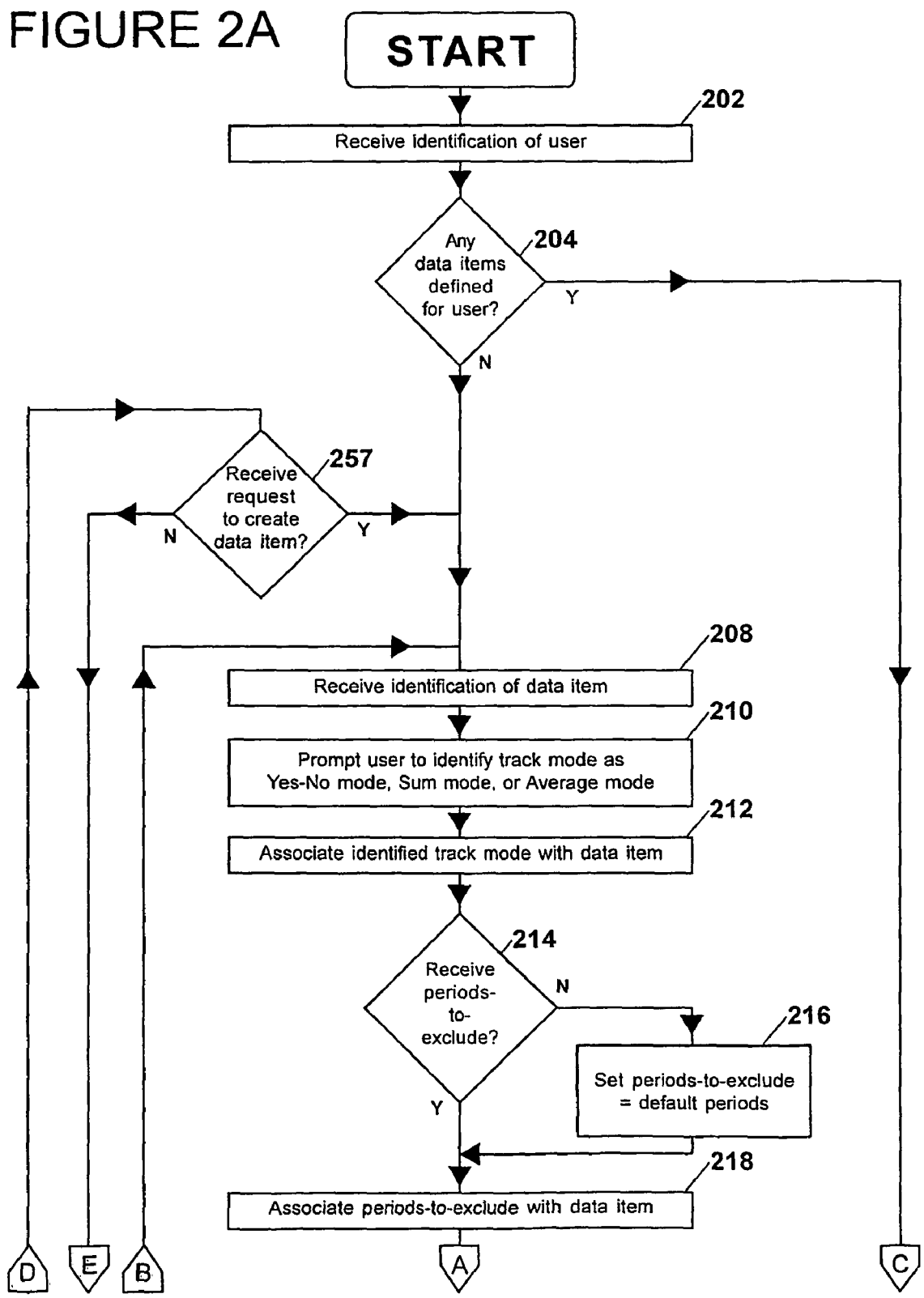

Figure 3

300
DEFINE ITEM
Name: Sales Calls —302
Abbreviate: SLS CLS —304
Category: Business —306
Mode: SUM | YES / NO | AVG.
308  310  312  314
OK  CANCEL

Figure 4

400
DEFINE ITEM
Name: Sales Calls —302
Abbreviate: SLS CLS
Category: Business 312 —314
Mode: SUM | YES / NO | AVG.
308  310
Change Defaults —402
404— S | M | T | W | TH | F | SA
406  GOALS  408
Daily: 25  Weekly: 125
Monthly: N/A  Quarterly: 1,500
Yearly: 5,000 —412
410  OK CANCEL —414

Figure 5

500
DEFINE ITEM
Name: Weight —502
Abbreviate: Weight
Category: Health —314
Mode: SUM | YES / NO | AVG.
Change Defaults
Goal: 180 —504
OK CANCEL

Figure 6

600
EXCLUDE WEEKS
Tap on a week to exclude it from data entry and analysis
606— YEAR: 2002 —602
J 6 13 20 27 | J 7 14 21 28 —604
F 3 10 17 24 | A 4 11 18 25
M 3 10 17 24 31 | S 1 18 15 22 39
A 7 14 21 28 | O 6 13 20 27
M 5 12 19 26 | N 3 10 17 24
J 2 9 16 23 30 | D 1 8 15 22 29
OK CANCEL

Figure 7

700
EXCLUDE MONTHS
Tap on a month to exclude it from data entry and analysis
JAN | JUL —702
FEB | AUG
MAR | SEP
APR | OCT
MAY | NOV
JUN | DEC
OK CANCEL

Figure 8A

| 2003-DEC | | | ▼All |
|---|---|---|---|
| ◄ ► Sales Calls | | | |
| S 16 | 804 | | |
| M 17 | 806 | | |
| T 18 | 808 | | |
| W 19 | 810 | | |
| T 20 | 812 | | |
| F 21 | 814 | | |
| S 22 | 816 | | |
| Wk | | | |

Figure 8B

| 2003-DEC | | | ▼All |
|---|---|---|---|
| ◄ ► | Workout | Weight | Sales Calls |
| S 16 | NO | 183 | EX |
| M 17 | YES | EX | 12 |
| T 18 | EX | 182 | 25 |
| W 19 | YES | EX | 0 |
| T 20 | YES | 181 | 28 |
| F 21 | 896 | 894 | 892 |
| S 22 | 880 | | |
| Wk | 3 | 182 | 65 |

Figure 14

| 2003-DEC | | Workout | | | | 1 |
|---|---|---|---|---|---|---|
| S | M | T | W | Th | F | S |
|  |  |  |  |  |  | YES |
| EX | YES | EX | YES | YES | EX | YES |
| EX | YES | EX | YES | YES | EX | YES |
| EX | YES | EX | NO | YES | EX | YES |
| EX | NO | YES | YES | NO | EX | YES |
| EX | YES |  |  |  |  |  |

COUNT=16  AVG.=84.2  %GOAL=84.2

Figure 15

| 2003-W | Workout | | 4 |
|---|---|---|---|
|  | COUNT | AVG. | %GOAL |
| WK 48 | 4 | — | 100 |
| WK 49 | 4 | — | 100 |
| WK 50 | 3 | — | 75 |
| WK 51 | 3 | — | 75 |
| WK 52 | EX | — | EX |
| WK 01 |  |  |  |
| TOTAL | 14 | 3.5 | 87.5 |

Figure 16

| 2003-M | Workout | | 20 |
|---|---|---|---|
|  | COUNT | AVG/MON | %GOAL |
| JAN | 16 | — | 80 |
| FEB | 12 | — | 60 |
| MAR | EX | EX | EX |
| 1st Q | 28 | 14 | 70 |
| APR | 14 | — | 70 |
| MAY | 20 | — | 100 |
| JUN | 18 | — | 90 |
| 2nd Q | 52 | 17.33 | 86.66 |

Figure 17

| 2003 | Workout | | 250 |
|---|---|---|---|
|  | Count | AVG/MON | %Goal |
| 1stQ | 28 | 9.33 | 46.65 |
| 2ndQ | 52 | 17.33 | 86.65 |
| 3rdQ | 56 | 18.66 | 93.30 |
| 4thQ | 50 | 16.66 | 83.30 |
| 2003 | 186 | 15.5 | 74.40 |
| TTL | 407 |  |  |

Figure 18

| ALL | Workout | | |
|---|---|---|---|
|  | Count | AVG/MON | %Goal |
| 2000 | EX | EX | EX |
| 2001 | 27 | 2.25 | 90 |
| 2002 | 194 | 16.17 | 77.6 |
| 2003 | 186 | 15.5 | 74.4 |
| TTL | 407 | 284.3 | 76.79 |

Figure 19
Figure 20
Figure 21
Figure 22
Figure 23

US 8,155,997 B2

METHODS AND SYSTEMS FOR PERFORMANCE TRACKING

CROSS-REFERENCE TO RELATED APPLICATIONS

This application claims the benefit of the filing date of U.S. Provisional Application No. 60/360,515, entitled "Computerized Performance Tracking System," filed on Feb. 28, 2002.

FIELD OF THE INVENTION

The present invention relates to a method and system for tracking a data item. More particularly, the invention relates to a method and system for tracking the performance of a data item based on a tracking mode.

BACKGROUND OF THE INVENTION

Conventional paper systems such as day planners provide log sheets that allow a person to manually track almost any data item the person desires, such as the number of pages the person read in a book for a given day, the person's weight, blood pressure, cholesterol or exercise repetitions (i.e., number of push ups, sit ups, etc.) But these conventional paper systems require that the person manually calculate the performance of the data item for a given period. Thus, the log sheets are typically inconvenient, time consuming, and often difficult to maintain.

Conventional computerized tracking systems such as personal digital assistants, allow for specific predefined data items to be tracked. For example, conventional computerized tracking systems may have a financial tracking program or a diet tracking program, but these systems only allow a person to keep a record of the person's performance in the respective area (e.g., finance or diet). There are also conventional computerized tracking systems that allow the user to create items to be tracked, but these conventional computerized tracking systems limit the type of data that can be collected typically to averages. Furthermore, these conventional systems do not use days as the basic unit of entry, nor do they allow a user to set performance goals in association with the data item. Thus, there is a need for a performance tracking system that allows a user to track any type of data item, instead of being limited to tracking items defined by the tracking system. In addition, there is a need for a performance tracking system that allows a user to track unrelated data items simultaneously, such as tracking the number of sales calls made by a user, a user's weight on average, or whether a user has worked out on a given day.

SUMMARY OF THE INVENTION

Methods and systems consistent with the present invention provide a performance tracking tool that allows a user to define, log, and determine the performance of any data item, where the data item is associated with tracking mode that is either a LOGICAL mode, a SUM mode, or an AVERAGE mode. In addition, the performance tracking tool allows the user to view multiple, unrelated data items simultaneously and to log a data entry for one of the unrelated data items while simultaneously viewing the multiple, unrelated data items.

In accordance with methods consistent with the present invention, a method is provided in a data processing system. The method comprises the steps of receiving an identification of a data item, associating the data item with one of a plurality of tracking modes, the plurality of tracking modes including at least two of a LOGICAL mode, a SUM mode, and an AVERAGE mode, determining the performance of the data item based on the associated one tracking mode. The method may also comprise the step of receiving a goal corresponding to the data item, and determining the performance of the data item in relation to the goal based on the associated one tracking mode. The method may also comprise the step of receiving a period-to-exclude, and determining the performance of the data item in relation to the goal based on the associated one tracking mode and the period-to-exclude.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings:

FIG. 1 depicts a block diagram of a data processing system suitable for practicing methods and implementing systems consistent with the present invention;

FIGS. 2A-2E depicts a flow diagram illustrating an exemplary process performed by a performance tracking tool of the data processing system in FIG. 1 to define, log, and track the performance of a data item in accordance with the present invention;

FIG. 3 depicts an exemplary user interface displayed by the performance tracking tool to allow a user to define a new data item to be tracked in accordance with an associated track mode;

FIG. 4 depicts an exemplary user interface displayed by the performance tracking tool to allow the user to identify goals to associate with the data item when the track mode associated with the data item is a SUM mode or a YES/NO mode;

FIG. 5 depicts an exemplary user interface displayed by the performance tracking tool to allow the user to identify a goal to associate with the data item when the track mode associated with the data item is an AVG. mode;

FIG. 6 depicts an exemplary user interface displayed by the performance tracking tool to allow the user to identify weeks to exclude when tracking the data item;

FIG. 7 depicts an exemplary user interface displayed by the performance tracking tool to allow the user to identify months to exclude when tracking the data item;

FIG. 8A depicts an exemplary user interface displayed by the performance tracking tool to reflect an empty log for a newly defined data item;

FIG. 8B depicts an exemplary user interface displayed by the performance tracking tool to allow a user to view a log of data entries associated with the data item and to provide a new data entry into the log in accordance with the present invention;

FIG. 14 depicts an exemplary user interface displayed by the performance tracking tool in response to a user request to determine the performance of a data item, where the track mode of the data item is a YES/NO mode and the performance time segment corresponds to a daily time segment.

FIG. 15 depicts an exemplary user interface displayed by the performance tracking tool in response to a user request to determine the performance of a data item, where the track mode of the data item is a YES/NO mode and the performance time segment corresponds to a weekly time segment.

FIG. 16 depicts an exemplary user interface displayed by the performance tracking tool in response to a user request to determine the performance of a data item, where the track mode of the data item is a YES/NO mode and the performance time segment corresponds to a monthly time segment.

FIG. 17 depicts an exemplary user interface displayed by the performance tracking tool in response to a user request to determine the performance of a data item, where the track mode of the data item is a YES/NO mode and the performance time segment corresponds to a quarterly time segment.

FIG. 18 depicts an exemplary user interface displayed by the performance tracking tool in response to a user request to determine the performance of a data item, where the track mode of the data item is a YES/NO mode and the performance time segment corresponds to a yearly time segment.

FIG. 19 depicts an exemplary user interface displayed by the performance tracking tool in response to a user request to determine the performance of a data item, where the track mode of the data item is an AVERAGE mode and the performance time segment corresponds to a daily time segment.

FIG. 20 depicts an exemplary user interface displayed by the performance tracking tool in response to a user request to determine the performance of a data item, where the track mode of the data item is an AVERAGE mode and the performance time segment corresponds to a weekly time segment.

FIG. 21 depicts an exemplary user interface displayed by the performance tracking tool in response to a user request to determine the performance of a data item, where the track mode of the data item is an AVERAGE mode and the performance time segment corresponds to a monthly time segment.

FIG. 22 depicts an exemplary user interface displayed by the performance tracking tool in response to a user request to determine the performance of a data item, where the track mode of the data item is an AVERAGE mode and the performance time segment corresponds to a quarterly time segment.

FIG. 23 depicts an exemplary user interface displayed by the performance tracking tool in response to a user request to determine the performance of a data item, where the track mode of the data item is an AVERAGE mode and the performance time segment corresponds to a yearly time segment.

DETAILED DESCRIPTION OF THE INVENTION

Figure 2B:
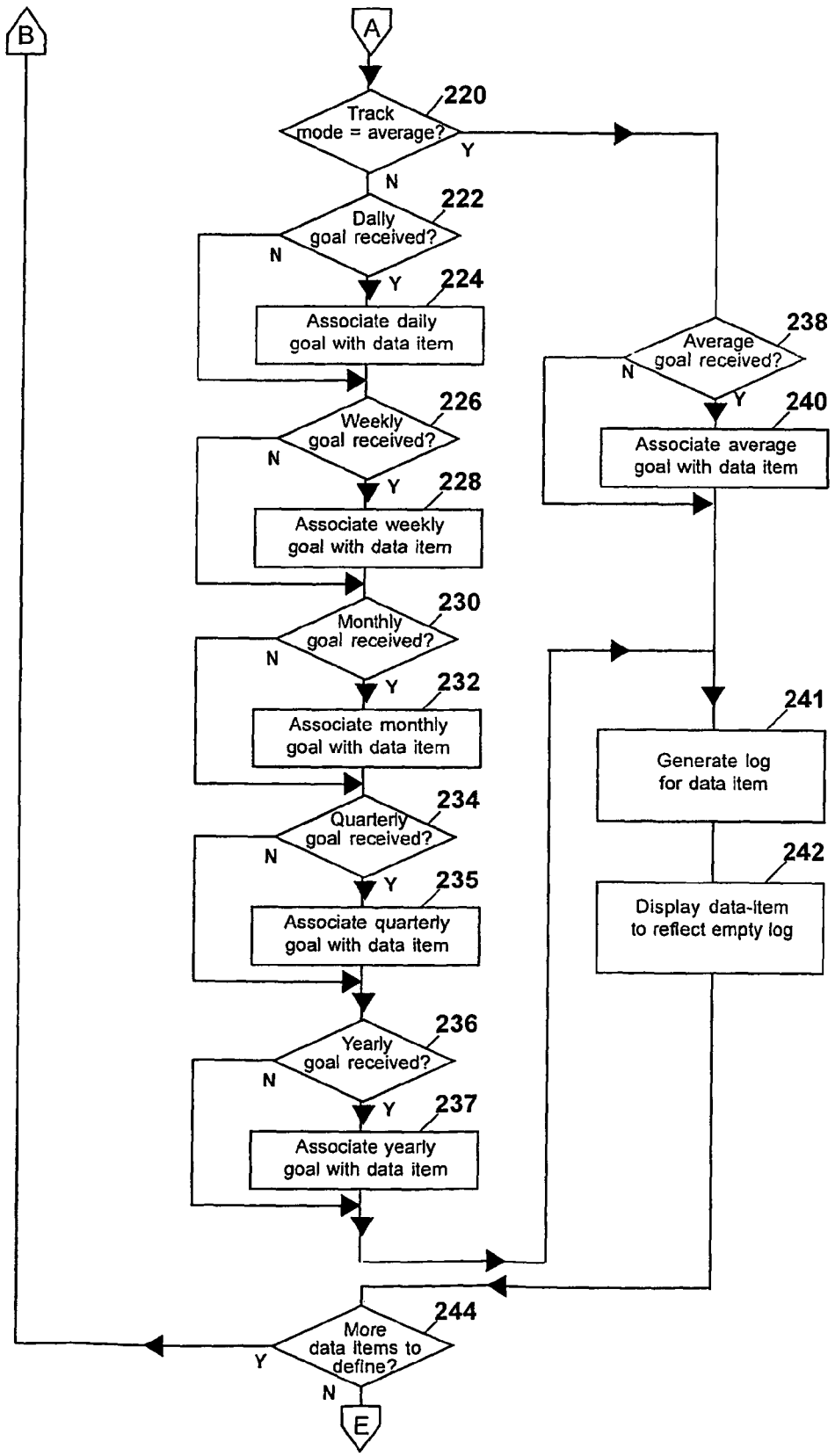
Figure 2C:
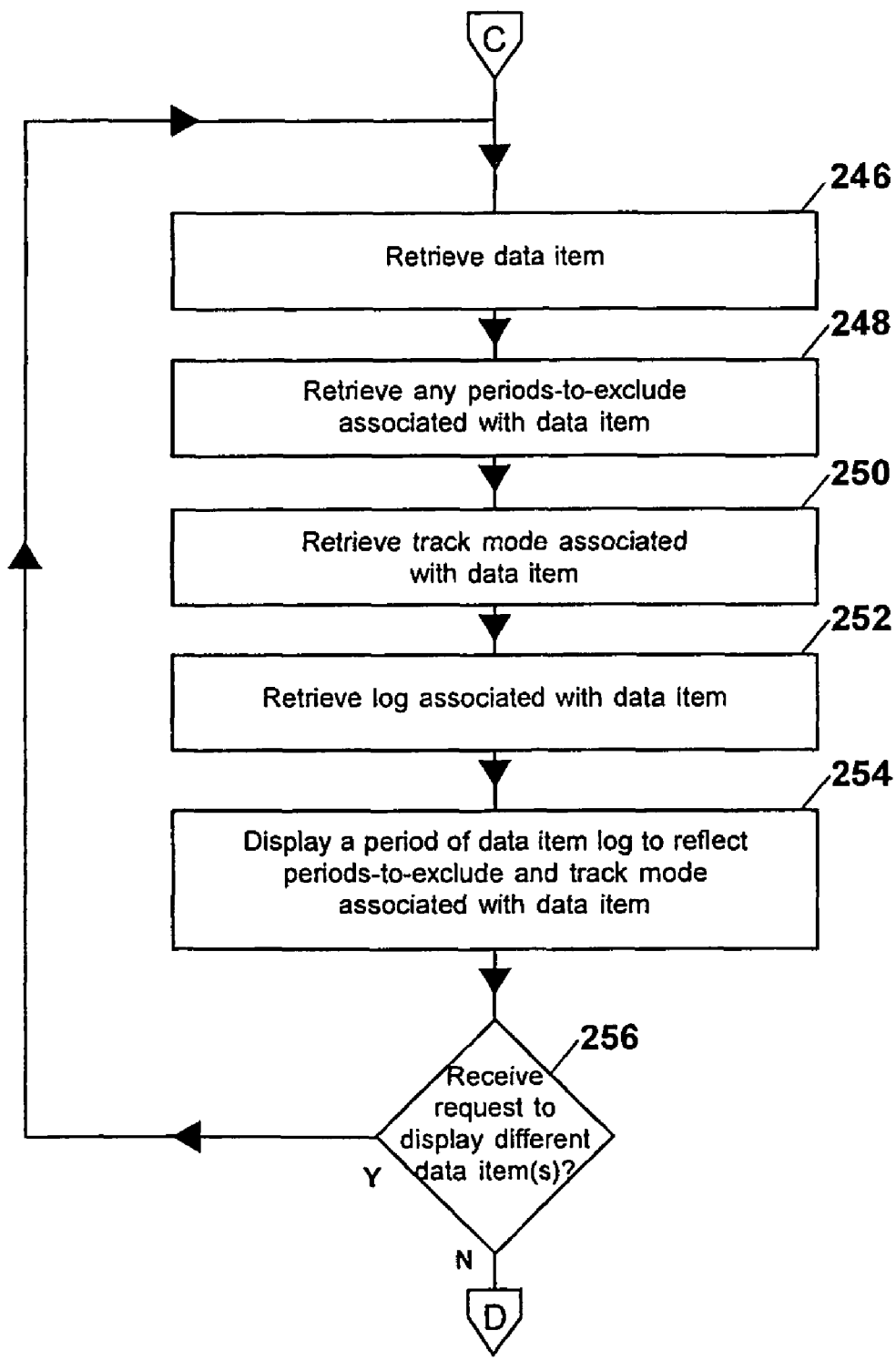
Figure 2D:
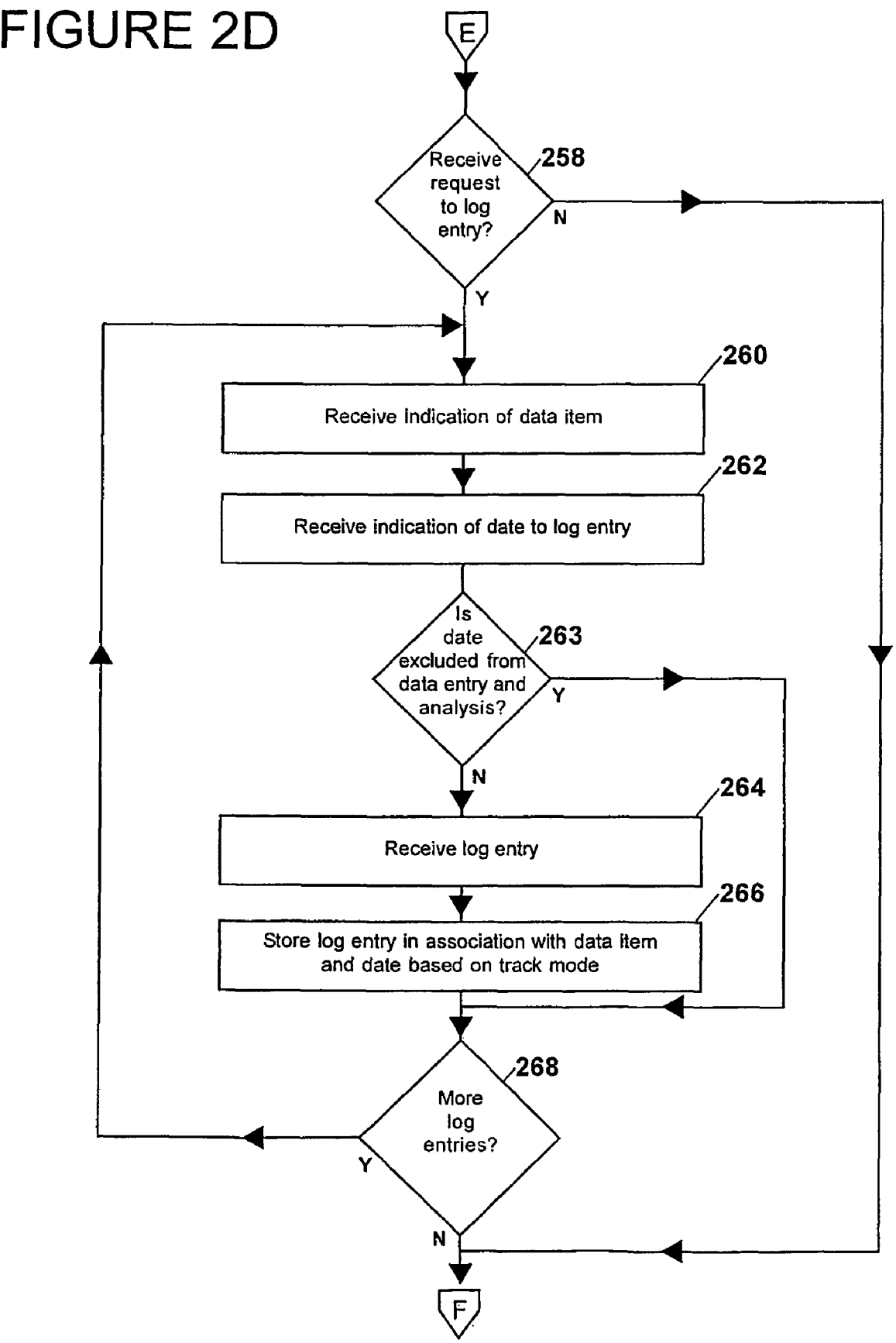
Figure 2E:
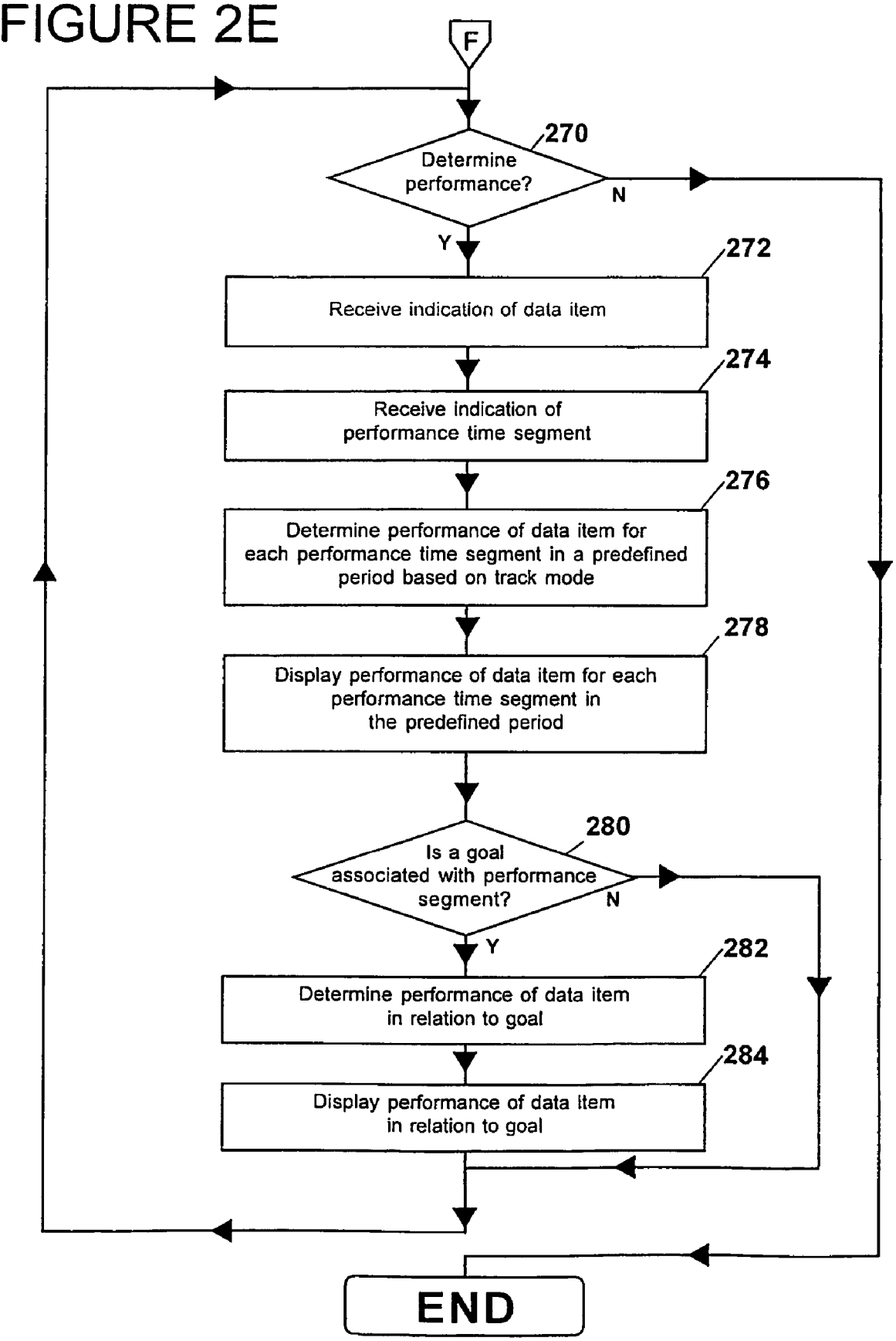

FIG. 1 depicts a data processing system 100 suitable for practicing methods and systems consistent with the present invention. The data processing system 100 includes a data processing computer 102 that includes a processor 104, a secondary storage device 106, a display 108, an I/O device 110 (such as a keyboard, mouse, stylist for touch-screen entry, network port, or other known computer data input or output device) and a memory 112. The memory 112 includes a performance tracking tool 114. The performance tracking tool 114 allows a user to define a data item to be tracked in association with a goal, to record the defined data item and data entries for the data item in a log 116, and to track the performance of the data item in relation to the goal as discussed in detail below. The log 116 may be stored in the secondary storage device 106 of the data processing system 100. The log 116 may be one or more files that include data items and associated goals defined by the user and any associated data entries. In one implementation, the log 116 may be a relational database in which a data item defined by the user is stored in association with an associated goal and data entries.

The data processing computer 102 may also include a transmitter 118 for communicating wirelessly over a network 120, such as the Internet, to another data processing computer 122 of the data processing system 100 that is connected to the network 120. In this implementation, the log 116 may be stored as a log 136 on the other data processing computer 122, such that the performance tracking tool 114 may access the log 136 over the network 120. In addition, the other data processing computer may have another performance tracking tool 134 that allows the user to access a centralized log 136 from either the wireless data processing computer 102 or from the other data processing computer 122 that is connected to the network 120.

In addition, although aspects of the present invention are depicted as being stored in memory 114, one skilled in the art will appreciate that all or part of systems and methods consistent with the present invention may be stored on or read from other computer-readable media, for example, secondary storage devices such as hard disks, floppy disks, and CD-ROMs; a signal received from a network such as the Internet; or other forms of ROM or RAM either currently known or later developed. Furthermore, although specific components of the data processing system 100 or data processing computers 102 and 122 are described, one skilled in the art will appreciate that a data processing system or data processing computer suitable for use with methods and systems consistent with the present invention may contain additional or different components.

FIGS. 2A-2E depict a flow diagram illustrating an exemplary process performed by the performance tracking tool 114 of the data processing system 102 to define, log and track the performance of a data item in accordance with the present invention. Initially, the tool 114 receives an identification of a user (Step 202). A user may provide an identification to the tool via the I/O device 110, such as a user name entered through a keypad. In one implementation the performance tracking tool 114 may upon startup default to a predefined identification of a user. In another implementation, the identification of a user may include an extension that further identifies the user as a manager authorized to retrieve data items defined by other users in an enterprise and identifies the identifications of the other users such that the tool 114 allows the manager to retrieve and view the data items of others in accordance with the present invention.

After receiving the identification of the user, the performance tracking tool 114 determines whether any data item has been defined for the user (Step 204). The performance tracking tool 114 may determine if any data items have been defined by the user by searching the secondary storage device 106 for a log 116 associated with the identified user. If no data items are defined for the user, the performance tracking tool 114 receives an identification of a data item (Step 208). FIG. 3 depicts an exemplary user interface 300 that the tool 114 may display to allow a user to indicate an identification of a data item such as "Sales Calls" data item 302. In one implementation, the user interface 300 displayed by the performance tracking tool 114 allows the user to indicate an abbreviation 304 for the identification or name of the data item 302. The tool may also allow a user to identify a category 306 so that a data item can be associated with other data items in log 116.

Next, the performance tracking tool 114 prompts the user to identify a track mode 308 as either a SUM mode 310, a YES/NO mode 312 (i.e., a logical mode), or an AVERAGE mode 314. (Step 210) As explained in further detail below, the track mode 308 associated with the data item 302 indicates to the performance tracking tool 114 how the data item is to be tracked in accordance with the present invention. For example, a data item 302 associated with SUM mode 310 indicates to the tool 114 that the log 116 data entries for the data item 302 indicate how many times that the data item 302 was performed for that day. For example, how many sales calls did the user make that day, or for a data item identified as pages read might indicate the number of pages of a book that the user has read on a given day. Alternatively, a YES/NO mode 312 or a logical mode may indicate to the tool 114 that the log 116 data entries for the identified data item indicate whether the data item was performed or not that day. For example, an identified data item for "Workout" would indicate whether the workout was performed or not that day. A data item identified as piano practicing and associated with a yes/no or logical mode 312 may indicate whether the user practiced the piano or not that day. If the user identifies that an AVERAGE mode 314 is associated with the data item 302, then the performance tracking tool 114 will track the level of a data item on a given day to obtain an average. For example, the tool 114 may track in log 116 a user's weight, a user's blood pressure (this may require two separate entries not shown in the figures for the two types of blood pressure), a user's height or a numerical grade point average. The performance tracking tool 114 then associates the identified track mode 308 with the data item 302 (Step 212). The performance tracking tool 114 may associate the track mode 308 with the data item by storing the track mode in association with the data item in the log 116.

The performance tracking tool 114 then determines whether periods-to-exclude have been received. (Step 214) The user may indicate to the performance tracking tool 114 that periods are to be excluded using any known data input to technique associated with the I/O device. For example, the user may use a stylus to select "Change Defaults" button 402 on user interface 400 as shown in FIG. 4. The performance tracking tool 114 may then display a menu 404 on user interface 400 for excluding a day of the week (e.g., Sunday), a user interface 600 for excluding weeks as shown in FIG. 6, or a user interface 700 for excluding months as shown in FIG. 7. The performance tracking tool 114, however, may provide a user interface to exclude any time period such as a portion of a day, a week, a month or a year. In one implementation, the performance tracking tool 114 may repeat the period-to-exclude. For example, if a user selects a day of the week from menu 404 (e.g., Sunday), the performance tracking tool 114 will exclude each Sunday for log 116 entry or performance tracking for the respective data item (e.g., "Sales Calls" data item 302). If periods-to-exclude have not been received, the performance tracking tool 114 may set periods-to-exclude to default periods. (Step 216) For example, the performance tracking tool 114 may set periods-to-exclude to Saturdays and Sundays by default when a user has not provided or indicated a week, month, year or other periods-to-exclude.

Next, the performance tracking tool 114 associates the periods-to-exclude with the data item. (Step 218). The performance tracking tool 114 may associate periods-to-exclude with the data item 302 by storing the periods to exclude with the data item 302 in the log 116.

Next, the performance tracking tool 114 determines whether the track mode associated with the data item 302 is the AVERAGE mode 314. (Step 220) The tool 114 allows the user to associate a daily goal 406, a weekly goal 408, a monthly goal 410, a quarterly goal 412, and a yearly goal 414 with the data item 302 if the track mode 308 associated with data item is either the SUM mode 310 or the YES/NO mode 312. Thus, if the tool 114 determines that the track mode 308 is not the AVERAGE mode 314 but is either the SUM mode 310 or the YES/NO mode 312 then the tool determines whether a daily goal has been received. (Step 222) If a daily goal 406 has been received, then the tool 114 associates the daily goal with the data item 302, for example, by storing the daily goal in association with the data item in the log 116. If, however, the user has not provided a daily goal 406 then the tool 114 continues processing at step 226. Next, the tool 110 determines whether a weekly goal has been received. (Step 226) If a weekly goal has been received, the tool associates the weekly goal with the data item 302. (Step 228). If a weekly goal has not been received by the tool, processing continues at step 230. The performance tracking tool 114 then determines whether a monthly goal has been received. (Step 230). If a monthly goal 410 has been received then the tool 114 associates the monthly goal with the data item 302. Again, the performance tracking tool 114 associates the monthly goal with the data item by storing the monthly goal with the daily item in log 116. If the monthly goal has not been received, the tool 114 continues processing at step 234. Next, the performance tracking tool 114 determines whether a quarterly goal has been received. (Step 234). If a quarterly goal has been received, the performance tracking tool 114 associates the quarterly goal with the daily item 302. (Step 235). The performance tracking tool 114 may associate the quarterly goal with the data item by storing the quarterly goal 412 with the data item 203 in the log 116. If a quarterly goal has not been received, the tool 114 continues processing at step 236. The performance tracking tool 114 then determines whether a yearly goal has been received. (Step 236). If a yearly goal has been received, the performance tracking tool 114 associates the yearly goal with the daily item 302. (Step 237). The performance tracking tool 114 may associate the yearly goal with the data item by storing the yearly goal 414 with the data item 203 in the log 116. If a yearly goal has not been received, the tool 114 continues processing at step 241.

If the track mode is determined to be the AVERAGE mode 314, the performance tracking tool 114 then determines whether an average goal has been received. (Step 238). For example, as shown in FIG. 5, when the track mode 308 for the data item 502 is identified as the AVERAGE mode 314, the performance tracking tool 114 may receive an average goal 504 from the user. If an average goal is received, the performance tracking tool 114 associates the average goal 504 with the data item 302. (Step 240). If an average goal is not received, then the performance tracking tool 114 continues processing at step 241.

After associating an identified goal (e.g., after steps 237 or 240), the performance tracking tool 114 may generate a log for the data item. (Step 241). For example, the tool 114 may generate the log 116 in secondary storage 106 to store the data item 302 with the associated track mode (e.g., SUM mode 310), the associated periods-to-exclude (e.g., Sundays on menu 404 of FIG. 4), and the associated goal (e.g., Daily goal 406, Weekly goal 408, Quarterly goal 412 and Yearly goal 414).

The performance tracking tool 114 may then display the data item 302 to reflect that the log 116 is empty or has no data entries. (Step 242) For example, FIG. 8A depicts an exemplary user interface 800 displayed by the performance tracking to reflect that for a predefined period 802 the log 116 is empty by displaying corresponding log entry fields 804, 806, 808, 810, 812, 814, and 816 as blank, indicating that the user has not provided the tool 114 with a data entry for the predefined period 802 of the log 116.

Next, the performance tracking tool 114 determines whether more data items are to be defined. (Step 244) If more data items are to be defined the performance tracking tool 114 continues processing at step 208. The user may indicate to the performance tracking tool 114 that more data items are to be defined utilizing any known data input technique associated with I/O device 110, such as providing a stylus tap on a drop down menu option (not shown in figures) or a predefined touch screen button on user interface 800 displayed by the tool 114 in FIG. 8A.

If the performance tracking tool determines that the data items have already been defined for the user in step 204, then the tool 114 retrieves the data item 302. (Step 246) For example, the tool 114 may retrieve the log 116 associated with the identified user and search within the log 116 for any data item therein, such as the data item 302 previously defined to track sales calls for the user. The tool 114 may also retrieve any periods-to-exclude (Step 248), the track mode (Step 250), and the log (Step 252) associated with the data item.

The tool 114 may then display a portion of the data item log corresponding to a predefined period to reflect the periods-to-exclude, data entries, and track mode associated with the data item for the predefined period. (Step 254). For example, FIG. 8B depicts an exemplary user interface 850 displayed by the performance tracking tool 114 to display a portion 852 of the log 116 for data item 854 (e.g., Sales Calls), 856 (e.g., Weight), and 858 (e.g., Workout) corresponding to the predefined period 860. In one implementation, each data item 854, 856, and 858 is stored in a separate log 116. In another implementation, the data items 854, 856, and 858 are stored in the same log 116 using known data structures to identify the data items within the log 116, such as file delimiters or database elements. In the implementation shown in FIG. 8B, the predefined period 860 is the current week of the present year. The predefined period 860, however, may be any period of time, such as a day, a week, or a month, of a calendar year. The predefined period 860 includes a group of consecutive time units 862-874, such as hours or days (e.g., time units 862-874 are days of the present week as shown in FIG. 8B), where each time unit is less than the predefined period 860. The portion 852 of the log 116 displayed by the performance tracking tool 114 may correspond to the predefined period 860 or a subset of the predefined period 860 when the performance tracking tool 114 determines that no data entries are associated with current or future time units 872, 874 of the predefined period 860. The performance tracking tool 114 displays a predefined symbol 876 (e.g., EX) to identify each period-to-exclude associated with each data item 854, 856, and 858. For example, as shown in FIG. 8B, the user may have identified to the tool 114, as discussed above, every Tuesday (or just the date of Dec. 18, 2003) is a period-to-exclude for the "Workout" data item 858. Thus, the performance tracking tool 114 displays the predefined symbol 876 in association with the corresponding time unit 866 of the predefined period 860 to reflect that this time unit 866 will not be considered by the performance tracking tool 114 when tracking the performance of the corresponding data item 858. The tool 114 may display the portion 852 of the log 116 to reflect that a logical or "Yes/No" track mode is associated with the "Workout" data item 858 by displaying a negative logical symbol, such as "NO," "−", or "0," for each negative logical data entry (e.g., data entry 878) and a positive logical symbol, such as "YES," "+", or "1" for each positive data entry (e.g., data entry 880). The tool 114 may display the portion 852 of the log 116 to reflect that a SUM track mode is associated with the "Sales Calls" data item 854 by displaying a total 882 of the data entries in the portion 852 of the log 116 for the "Sales Calls" data item 854 (e.g., 12+25+0+28=65). The tool 114 may display the portion 852 of the log 116 to reflect that an AVERAGE track mode is associated with the "Weight" data item 856 by displaying an average 884 of the data entries in the portion 852 of the log 116 for the "Weight" data item 856 (e.g., [183+182+181]/3=182).

Next, the performance tracking tool 114 may determine whether a request to display a different data item has been received. (Step 256). The performance tracking tool 114 may receive the request via the user utilizing any known data input technique associated with the I/O device 110, such as a stylus tap on a change screen arrow 886 or 888 of the user interface 850. If a request to display a different data item has been received, the tool 114 continues processing at step 246 to retrieve the next data item in the log 116 not already displayed by the tool 114 on the user interface 850.

If a request to display a different data item has not been received the tool 114 then determines whether a request to create a new data item has been received. (Step 257). The performance tracking tool 114 may receive the request to create a new data item via the user utilizing any known data input technique associated with the I/O device 110, such as a stylus tap on a predefined touch screen button on user interface 850 displayed by the tool 114 and FIG. 8B. If request to create a new data item has been received, the tool 114 continues processing at Step 208. If a request to create a new data item has not been received, the tool 114 determines whether a request to log a data entry has been received. (Step 258).

Performance tracking tool 114 may receive the request to log a data entry via the user utilizing any known data input technique associated with the I/O device 110, such as a stylus tap on any log entry field 892, 894 or 896. The tool 114 then receives an indication of the data item to associate with the log entry. (Step 260). The tool 114 may receive the indication of the data item to associate with the log entry when the user taps on the log entry field 892, 894 or 896. For example, the log entry field 892 indicates to the tool 114 that the data entry is to be associated with "Sales Calls" data item 854. The tap on the log entry field 894 indicates to the tool 114 that the data item to be associated with the log entry is "Weight" data item 856. Similarly, a tap on the log entry field 896 indicates to the tool 114 that the data entry is to be associated with the Workout data item 858.

The tool 114 then receives an indication of a date to associate with the log entry (Step 262). The tool 114 may receive an indication of a date to associate with the log entry by identifying the time unit corresponding to the selected log entry field 892, 894 or 896. For example, as shown in FIG. 8B when the user taps on either log entry field 892, 894 or 896, the tool 114 identifies the time unit 872 (e.g., Friday the 21$^{st}$) as the date to associate with the log entry.

The tool 114 then receives the log entry. (Step 264). The performance tracking tool 114 may receive the log entry via the user utilizing any known data input technique associated with the I/O device 110. For example, when the user selects the log entry field 896 associated with Workout data item 858, the tool 114 may interpret the first selection of the log entry field 896 as an indication of a positive logical entry, such as "yes" entry. The tool 114 may interpreted as a negative logical entry such as a "no" entry. Another tap on log entry field 896 may be interpret by the tool 114 being as removing the corresponding entry and thus displaying a blank again. In this implementation, the tool 114 may cycle between a positive logical entry, a negative logical entry, and no entry (e.g., blank field). If the user has identified the log entry field 894 associated with "Weight" data item 856 or identified log entry field 892 associated with "Sales Calls" data item 854, the tool 114 may receive the associated log entry via the user entering a number utilizing a keypad associated with the I/O device 110.

The performance tracking tool then stores the log entry in association with the data item and date based on the track mode. (Step 266). The tool then determines whether more log entries are to be received. (Step 268). If the tool determines that more log entries are to be received the tool 114 continues processing. (Step 260). If no more log entries have been received, the performance tracking tool 114 then determines whether a request to determine the performance of the data item has been received. (Step 270). The performance tracking tool 114 may receive a request to determine the performance of the data item via the user utilizing any known data input technique associated with the I/O device 110, such as the stylus tap on icon 898. If the tool 114 receives a request to determine the performance of data item, the tool then receives an indication of the data item. (Step 272). The tool 114 may receive the indication of the data item by identifying the data item corresponding to the last selected log entry field 892, 894, or 896 (e.g., Sales Calls data item 854, Weight data item 856, or Workout data item 858, respectively).

The performance tracking tool then receives an indication of a performance time segment. (Step 274). The performance time segment may correspond to any time unit, such as a day, a week, a month, or a year. For example, in the implementation shown in FIGS. 9-23, the tool 114 may receive the indication of a performance time segment 902, 1002, 1102, 1202, 1302, 1402, 1502, 1602, 1702, 1802, 1902, 2002, 2102, 2202, or 2302 via a user respectively selecting a daily time segment 902, weekly time segment 904, monthly time segment 906, a quarterly time segment 908, or a yearly time segment 910. In one implementation, the tool 114 upon receiving the indication of the data item in Step 272 may skip Step 274 and set the performance time segment (e.g., performance time segment 912 in FIG. 9) to the daily time segment 902 by default.

Next, the performance tracking tool 114 determines the performance of the data item for each performance time segment in a predefined period based on the track mode associated with the data item (Step 276) and then displays the performance of the data item for each performance time segment in the predefined period. (Step 278). The predefined period may be any time unit that is equal to or greater than the performance time segment. In one implementation, the tool 114 sets the predefined period based on the indicated performance time segment 902, 1002, 1102, 1202, 1302, 1402, 1502, 1602, 1702, 1802, 1902, 2002, 2102, 2202, or 2302 as shown in FIGS. 9-23. For example, when the tool 114 receives the indication that the performance time segment (e.g., 902 of FIG. 9, 1402 of FIG. 14, or 1902 of FIG. 19) corresponds to the daily time segment 902, the tool 114 sets the predefined period to be a calendar month 914 such that the tool 114 retrieves each data entry for the data item (e.g., "Sales Calls" data item 854, "Workout" data item 858, or "Weight" data item 856) in a portion 916, 1404, or 1904 of the log 116 corresponding to the calendar month 914, 1406, or 1906 when determining the performance of the data item for each performance time segment 902, 1402, or 1902 (e.g., each day of the calendar month 914, 1406, or 1906, respectively).

Figure 9:
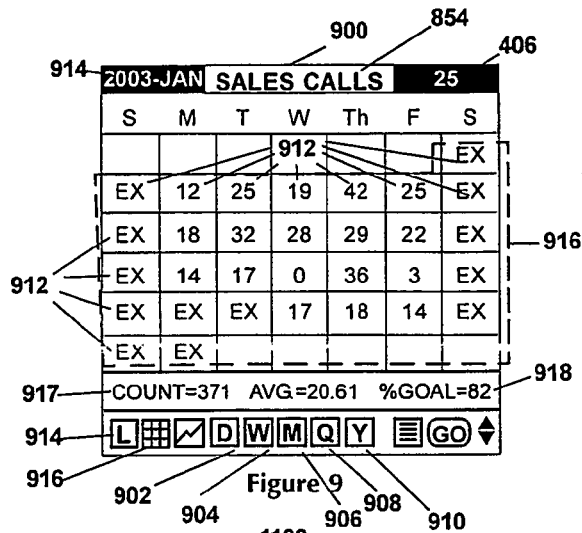
FIG. 9 depicts an exemplary user interface displayed by the performance tracking tool in response to a user request to determine the performance of a data item, where the track mode of the data item is a SUM mode and the performance time segment corresponds to a daily time segment.

In the implementation shown in FIG. 9, when the track mode 308 of the data item (e.g., "Sales Calls" data item 854) is the SUM mode 310 and the performance time segment 902 corresponds to a daily time segment, the tool 114 determines the performance of each performance time segment by setting each performance time segment to the corresponding log 116 data entry of the data item for the predefined period (calendar month 914). Thus, the tool 114 allows the user to view the daily performance as a daily count of the data item in a monthly calendar view when the associated track mode 308 of the data item 854 is the SUM mode 310 as shown in FIG. 9. The tool 114 may also determine and display a performance total 917 for the predefined period (e.g., calendar month 914) so that user is able to view the performance for the predefined period relative to the performance for each performance time segment.

In the implementation shown in FIG. 14, when the track mode 308 of the data item (e.g., "Workout" data item 858) is the YES/NO mode 312 and the performance time segment 1402 corresponds to a daily time segment, the tool 114 determines the performance of each performance time segment 1402 by setting each performance time segment to the corresponding log 116 logical data entry of the data item for the predefined period or calendar month 1404. Thus, the tool 114 allows the user to view the daily performance as a daily positive or negative logical (e.g., "YES" or "NO" to indicate that the workout was performed or not) of the data item in a monthly calendar view when the associated track mode 308 of the data item 858 is the YES/NO mode 312 as shown in FIG. 14. The tool 114 may also determine and display a performance total 1409 for the predefined period (e.g., calendar month 1406) so that user is able to view the performance for the predefined period relative to the performance for each performance time segment. In this implementation, performance total 1409 reflects the number of positive logical (i.e., "YES") log 116 entries associated with the "Workout" data item 858 for the predefined period 1406. In another implementation, the performance total 1409 may reflect the number of negative logical (i.e., "NO") log 116 entries associated with the "Workout" data item 858 for the predefined period 1406.

In the implementation shown in FIG. 19, when the track mode 308 of the data item (e.g., "Weight" data item 856) is the AVERAGE mode 314 and the performance time segment 1902 corresponds to a daily time segment, the tool 114 determines the performance of each performance time segment 1902 by setting each performance time segment to the corresponding log 116 average data entry of the data item for the predefined period or calendar month 1906. Thus, the tool 114 allows the user to view the daily performance as a daily average of the data item in a monthly calendar view when the associated track mode 308 of the data item 856 is the AVERAGE mode 314 as shown in FIG. 19. The tool 114 may also determine and display a performance total 1909 for the predefined period (e.g., calendar month 1906) so that user is able to view the performance for the predefined period relative to the performance for each performance time segment. In this implementation, the performance total 1909 reflects the average of the log 116 entries associated with the "Weight" data item 856 for the predefined period 1906.

Figure 10:
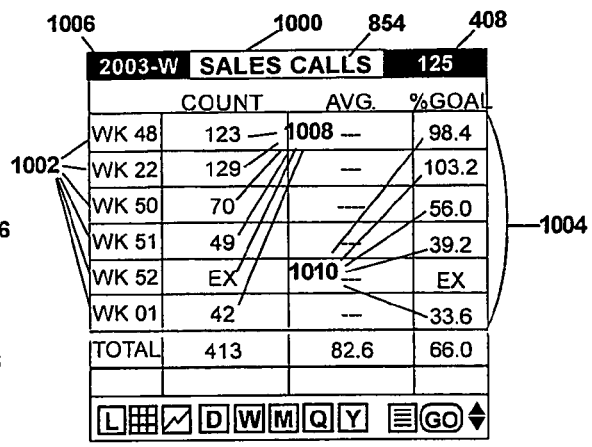
FIG. 10 depicts an exemplary user interface displayed by the performance tracking tool in response to a user request to determine the performance of a data item, where the track mode of the data item is a SUM mode and the performance time segment corresponds to a weekly time segment.

Referring to FIGS. 10, 15, and 20, when the tool 114 receives the indication that the performance time segment (e.g., 1002 of FIG. 10, 1502 of FIG. 15, or 2002 of FIG. 20) corresponds to the weekly time segment 904, the tool 114 sets the predefined period 1004, 1504, or 2004 to be one or more consecutive weeks of a calendar year 1006, 1506, or 2006. The tool 114 retrieves each log 116 data entry for the data item (e.g., "Sales Calls" data item 854, "Workout" data item 858, or "Weight" data item 856) that corresponds to the performance time segment 1002, 1502, or 2002 of the predefined period 1004, 1504, or 2004 when determining the performance of the data item for the respective performance time segment 1002, 1502, or 2002 (e.g., for each week of the predefined period 1004, 1504, or 2004 of the calendar year 1006, 1506, or 2006).

In the implementation shown in FIG. 10, when the track mode 308 of the data item (e.g., "Sales Calls" data item 854) is the SUM mode 310 and the performance time segment 1002 corresponds to a weekly time segment, the tool 114 determines the performance of each performance time segment 1002 by determining a corresponding count 1008 that reflects the total of each log 116 data entry (not including periods-to-exclude) of the data item 854 for the respective performance time segment 1002. Thus, the tool 114 allows the user to view the consecutive weekly performance of the data item for the predefined period 1004 when the associated track mode 308 of the data item 854 is the SUM mode 310 as shown in FIG. 10.

In the implementation shown in FIG. 15, when the track mode 308 of the data item (e.g., "Workout" data item 858) is the YES/NO mode 312 and the performance time segment 1502 corresponds to a weekly time segment, the tool 114 determines the performance of each performance time segment 1502 by determining a corresponding count 1508 that reflects the total of positive logical (e.g., "YES") log 116 data entries (not including periods-to-exclude) of the data item 858 for the respective performance time segment 1502. Thus, the tool 114 allows the user to view the consecutive weekly performance of the data item for the predefined period 1004 when the associated track mode 308 of the data item 858 is the YES/NO mode 312 as shown in FIG. 15.

In the implementation shown in FIG. 20, when the track mode 308 of the data item (e.g., "Weight" data item 856) is the AVERAGE mode 314 and the performance time segment 2002 corresponds to a weekly time segment, the tool 114 determines the performance of each performance time segment 2002 by determining a corresponding AVERAGE 2008 that reflects the average of log 116 data entries (not including periods-to-exclude) of the data item 854 for the respective performance time segment 2002. Thus, the tool 114 allows the user to view the consecutive weekly performance of the data item for the predefined period 2004 when the associated track mode 308 of the data item 856 is the AVERAGE mode 314 as shown in FIG. 20.

Figure 11:
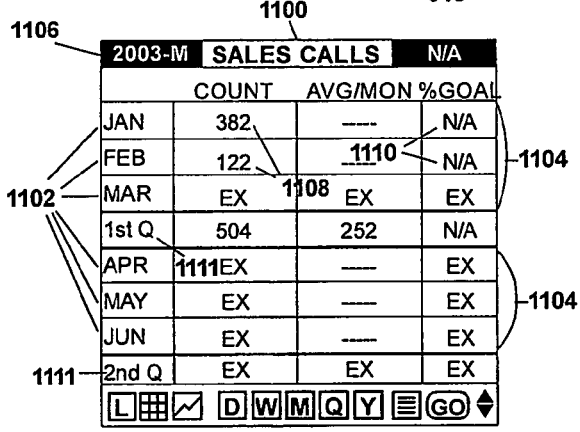
FIG. 11 depicts an exemplary user interface displayed by the performance tracking tool in response to a user request to determine the performance of a data item, where the track mode of the data item is a SUM mode and the performance time segment corresponds to a monthly time segment.

Referring to FIGS. 11, 16, and 21, when the tool 114 receives the indication that the performance time segment (e.g., 1102 of FIG. 11, 1602 of FIG. 16, or 2102 of FIG. 21) corresponds to the monthly time segment 906, the tool 114 sets the predefined period 1104, 1604, or 2104 to be one or more consecutive months of a calendar year 1106, 1606, or 2106. The tool 114 retrieves each log 116 data entry for the data item (e.g., "Sales Calls" data item 854, "Workout" data item 858, or "Weight" data item 856) that corresponds to the respective performance time segment 1102, 1602, or 2102 of the predefined period 1104, 1604, or 2104 when determining the performance of the data item for the respective performance time segment 1102, 1602, or 2102 (e.g., for each month of the predefined period 1104, 1604, or 2104 of the calendar year 1106, 1606, or 2106).

In the implementation shown in FIG. 11, when the track mode 308 of the data item (e.g., "Sales Calls" data item 854) is the SUM mode 310 and the performance time segment 1102 corresponds to a monthly time segment, the tool 114 determines the performance of each performance time segment 1102 by determining a corresponding count 1108 that reflects the total of each log 116 data entry (not including periods-to-exclude) of the data item 854 for the respective performance time segment 1102. Thus, the tool 114 allows the user to view the consecutive monthly performance of the data item for the predefined period 1104 when the associated track mode 308 of the data item 854 is the SUM mode 310 as shown in FIG. 11. The tool 114 may also determine and display a performance total 1111 for the predefined period 1104 (e.g., $1^{st}$ or $2^{nd}$ quarter of the calendar year 1106) so that user is able to view the performance for the predefined period relative to the performance for each performance time segment.

In the implementation shown in FIG. 16, when the track mode 308 of the data item 858 is the YES/NO mode 312 and the performance time segment 1602 corresponds to a monthly time segment, the tool 114 determines the performance of each performance time segment 1602 by determining a corresponding count 1608 that reflects the total of positive logical (e.g., "YES") log 116 data entries (not including periods-to-exclude) of the data item 858 for the respective performance time segment 1602. Thus, the tool 114 allows the user to view the consecutive monthly performance of the data item for the predefined period 1604 when the associated track mode 308 of the data item 858 is the YES/NO mode 312 as shown in FIG. 16. The tool 114 may also determine and display a performance total 1611 for the predefined period 1604 (e.g., $1^{st}$ or $2^{nd}$ quarter of the calendar year 1606) so that user is able to view the performance for the predefined period relative to the performance for each performance time segment. In this implementation, the performance total 1611 reflects the number of positive logical (e.g., "YES") log 116 entries associated with the "Workout" data item 858 for the predefined period 1604.

In the implementation shown in FIG. 21, when the track mode 308 of the data item 856 is the AVERAGE mode 314 and the performance time segment 2102 corresponds to a monthly time segment, the tool 114 determines the performance of each performance time segment 2102 by determining a corresponding AVERAGE 2108 that reflects the average of log 116 data entries (not including periods-to-exclude) of the data item 856 for the respective performance time segment 2102. Thus, the tool 114 allows the user to view the consecutive monthly performance of the data item for the predefined period 2104 when the associated track mode 308 of the data item 856 is the AVERAGE mode 314 as shown in FIG. 21.

Figure 12:
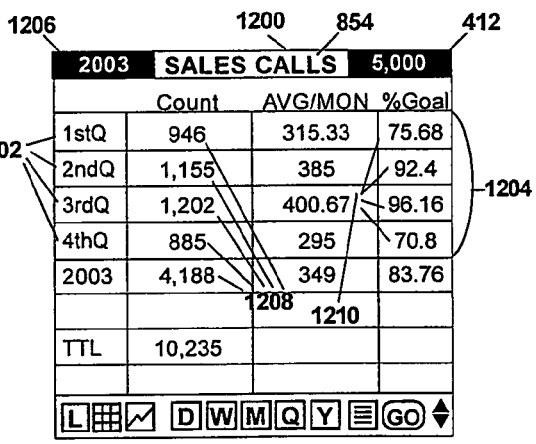
FIG. 12 depicts an exemplary user interface displayed by the performance tracking tool in response to a user request to determine the performance of a data item, where the track mode of the data item is a SUM mode and the performance time segment corresponds to a quarterly time segment.

Referring to FIGS. 12, 17, and 22, when the tool 114 receives the indication that the performance time segment (e.g., 1202 of FIG. 12, 1702 of FIG. 17, or 2202 of FIG. 22)

corresponds to the quarterly time segment 908, the tool 114 sets the predefined period 1204, 1704, or 2204 to be one or more consecutive quarters of a calendar year 1206, 1706, or 2206. The tool 114 retrieves each log 116 data entry for the data item (e.g., "Sales Calls" data item 854, "Workout" data item 858, or "Weight" data item 856) that corresponds to the respective performance time segment 1202, 1702, or 2202 of the predefined period 1204, 1704, or 2204 when determining the performance of the data item for the respective performance time segment 1202, 1704, or 2204 (e.g., for each quarter of the predefined period 1204, 1704, or 2204 of the calendar year 1206, 1706, or 2206).

In the implementation shown in FIG. 12, when the track mode 308 of the data item (e.g., "Sales Calls" data item 854) is the SUM mode 310 and the performance time segment 1202 corresponds to a quarterly time segment, the tool 114 determines the performance of each performance time segment 1202 by determining a corresponding count 1208 that reflects the total of each log 116 data entry (not including periods-to-exclude) of the data item 854 for the respective performance time segment 1202. Thus, the tool 114 allows the user to view the consecutive quarterly performance of the data item for the predefined period 1204 when the associated track mode 308 of the data item 854 is the SUM mode 310 as shown in FIG. 12.

In the implementation shown in FIG. 17, when the track mode 308 of the data item 858 is the YES/NO mode 312 and the performance time segment 1702 corresponds to a quarterly time segment, the tool 114 determines the performance of each performance time segment 1702 by determining a corresponding count 1708 that reflects the total of positive logical (e.g., "YES") log 116 data entries (not including periods-to-exclude) of the data item 858 for the respective performance time segment 1702. Thus, the tool 114 allows the user to view the consecutive quarterly performance of the data item for the predefined period 1704 when the associated track mode 308 of the data item 858 is the YES/NO mode 312 as shown in FIG. 17.

In the implementation shown in FIG. 22, when the track mode 308 of the data item 856 is the AVERAGE mode 314 and the performance time segment 2202 corresponds to a quarterly time segment, the tool 114 determines the performance of each performance time segment 2202 by determining a corresponding AVERAGE 2208 that reflects the average of log 116 data entries (not including periods-to-exclude) of the data item 856 for the respective performance time segment 2202. Thus, the tool 114 allows the user to view the consecutive quarterly performance of the data item for the predefined period 2204 when the associated track mode 308 of the data item 856 is the AVERAGE mode 314 as shown in FIG. 22.

Figure 13:
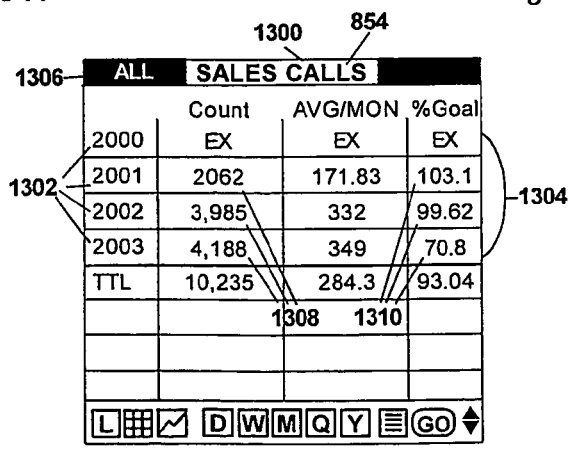
FIG. 13 depicts an exemplary user interface displayed by the performance tracking tool in response to a user request to determine the performance of a data item, where the track mode of the data item is a SUM mode and the performance time segment corresponds to a yearly time segment.

Referring to FIGS. 13, 18, and 23, when the tool 114 receives the indication that the performance time segment (e.g., 1302 of FIG. 13, 1802 of FIG. 18, or 2302 of FIG. 23) corresponds to the yearly time segment 910, the tool 114 sets the predefined period 1304, 1804, or 2304 to be a range 1306, 1806, or 2306 of years, preferably all years tracked in the log 116 for the respective data item 854, 856, or 858. The tool 114 retrieves each log 116 data entry for the data item (e.g., "Sales Calls" data item 854, "Workout" data item 858, or "Weight" data item 856) that corresponds to the respective performance time segment 1302, 1802, or 2302 of the predefined period 1304, 1804, or 2304 when determining the performance of the data item for the respective performance time segment 1302, 1802, or 2302 (e.g., for each year of the predefined period 1304, 1804, or 2304 of the range 1306, 1806, or 2306 of years).

In the implementation shown in FIG. 13, when the track mode 308 of the data item (e.g., "Sales Calls" data item 854) is the SUM mode 310 and the performance time segment 1302 corresponds to a yearly time segment the tool 114 determines the performance of each performance time segment 1302 by determining a corresponding count 1308 that reflects the total of each log 116 data entry (not including periods-to-exclude) of the data item 854 for the respective performance time segment 1302. Thus, the tool 114 allows the user to view consecutive yearly performance of the data item for the predefined period 1304 when the associated track mode 308 of the data item 854 is the SUM mode 310 as shown in FIG. 13.

In the implementation shown in FIG. 18, when the track mode 308 of the data item 858 is the YES/NO mode 312 and the performance time segment 1802 corresponds to a yearly time segment, the tool 114 determines the performance of each performance time segment 1802 by determining a corresponding count 1808 that reflects the total of positive logical (e.g., "YES") log 116 data entries (not including periods-to-exclude) of the data item 858 for the respective performance time segment 1802. Thus, the tool 114 allows the user to view consecutive yearly performance of the data item for the predefined period 1804 as shown in FIG. 18.

In the implementation shown in FIG. 23, when the track mode 308 of the data item 856 is the AVERAGE mode 314 and the performance time segment 2302 corresponds to a quarterly time segment, the tool 114 determines the performance of each performance time segment 2302 by determining a corresponding AVERAGE 2308 that reflects the average of log 116 data entries (not including periods-to-exclude) of the data item 856 for the respective performance time segment 2302. Thus, the tool 114 allows the user to view consecutive yearly performance of the data item for the predefined period 2304 when the associated track mode 308 of the data item 856 is the AVERAGE mode 314 as shown in FIG. 23.

Referring back to FIG. 2E, the performance tracking tool next determines if a goal is associated with the performance time segment for the data item. (Step 280). As discussed above, the tool 114 allows the user to associate a daily goal 406, a weekly goal 408, a monthly goal 410, a quarterly goal 412, and a yearly goal 414 with a data item when the track mode 308 associated with the data item is a SUM mode 310 or a YES/NO mode 312, such as "Sales Calls" data item 854 and "Workout" data item 858. When the track mode 308 associated with the data item is a SUM mode 310 or a YES/NO mode 312 and the indicated performance time segment is a daily time segment 912 or 1402, the tool 114 determines that a goal is associated with the performance time segment 912 or 1402 if a daily goal 406 is associated with the data item 854, 858. When the track mode 308 associated with the data item is a SUM mode 310 or a YES/NO mode 312 and the indicated performance time segment is a weekly segment 1002 or 1502, the tool 114 determines that a goal is associated with the performance time segment 1002 or 1502 if a weekly goal 408 is associated with the data item 854, 858. When the track mode 308 associated with the data item is a SUM mode 310 or a YES/NO mode 312 and the indicated performance time segment is a monthly segment 1102 or 1602, the tool 114 determines that a goal is associated with the performance time segment 1102 or 1602 if a monthly goal 410 is associated with the data item 854, 858. When the track mode 308 associated with the data item is a SUM mode 310 or a YES/NO mode 312 and the indicated performance time segment is a quarterly time segment 1202 or 1702, the tool 114 determines that a goal is associated with the performance time segment 1202 or 1702 if a quarterly goal 412 is associated with the data item 854, 858. When the track mode 308 associated with the data item is a SUM mode 310 or a YES/NO mode 312 and the indicated performance time segment is a yearly time segment 1302 or 1802, the tool 114 determines that a goal is associated with the performance time segment 1302 or 1802 if a yearly goal 414 is associated with the data item 854, 858. For example, in the implementation shown in FIG. 9, the tool 114 determines that a goal is associated with the performance time segment 912 since a daily goal 406 of "25" was associated with the "Sales Calls" data item 854. Similarly, the tool 114 determines that a goal is associated with the performance time segment 1402 since a daily goal 1410 of "1" positive logical was associated with the "YES/NO" data item 858.

The tool 114 also allows the user to associate an average goal 504 with a data item when the track mode 308 associated with the data item is an AVERAGE mode 314, such as "Weight" data item 856. When the track mode 308 associated with the data item is an AVERAGE mode 314, the tool 114 determines that a goal is associated with the performance time segment 1902, 2002, 2102, 2202, or 2302 if an AVERAGE goal 504 is associated with the data item 858.

If a goal is associated with the performance time segment, the tool 114 determines the performance of the data item in relation to the goal. (Step 282). The tool 114 determines the performance of the data item, such as "Sales Calls" data item 854, "Workout" data item 858, and "Weight" data item 856, in relation to the goal based on the track mode 308 associated with the data item. For example, in the implementation shown in FIG. 9, the tool 114 identifies that the track mode 308 associated with the "Sales Calls" data item 854 is the SUM mode 310 and then generates a goal percentage 918 that reflects the average of the log 116 data entries (not including the periods-to-exclude) in relation to the daily goal 406 associated with the "Sales Calls" data item 854. In the implementation shown in FIG. 10, the tool 114 identifies that the track mode 308 associated with the "Sales Calls" data item 854 is the SUM mode 310 and then generates a goal percentage 1010 for each performance time segment 1002 that reflects the average of the log 116 data entries (not including the periods-to-exclude) corresponding to the respective time segment 1002 in relation to the weekly goal 408 associated with the "Sales Calls" data item 854. In the implementation shown in FIG. 11, the tool 114 identifies that the track mode 308 associated with the "Sales Calls" data item 854 is the SUM mode 310 and then generates a goal percentage 1110 for each performance time segment 1102 that reflects the average of the log 116 data entries (not including the periods-to-exclude) corresponding to the respective time segment 1202 in relation to the monthly goal 410 associated with the "Sales Calls" data item 854. In the implementation shown in FIG. 12, the tool 114 identifies that the track mode 308 associated with the "Sales Calls" data item 854 is the SUM mode 310 and then generates a goal percentage 1210 for each performance time segment 1202 that reflects the average of the log 116 data entries (not including the periods-to-exclude) corresponding to the respective time segment 1202 in relation to the quarterly goal 412 associated with the "Sales Calls" data item 854. In the implementation shown in FIG. 13, the tool 114 identifies that the track mode 308 associated with the "Sales Calls" data item 854 is the SUM mode 310 and then generates a goal percentage 1310 for each performance time segment 1302 that reflects the average of the log 116 data entries (not including the periods-to-exclude) corresponding to the respective time segment 1302 in relation to the respective yearly goal 414 associated with the "Sales Calls" data item 854. In this implementation, each performance time segment 1308 corresponds to a separate year and the tool 114 allows the user to identify a separate yearly goal 414 (as well as a separate daily goal 406, weekly goal 408, monthly goal 410, and quarterly goal 412) for each year of log 116 data entries for the "Sales Calls" data item 854.

In the implementation shown in FIG. 14, the tool 114 identifies that the track mode 308 associated with the "Workout" data item 858 is the YES/NO mode 312 and then generates a goal percentage 1410 that reflects the average of the positive logical (e.g., "YES") log 116 data entries (not including the periods-to-exclude) in relation to the daily goal 406 associated with the "Workout" data item 858. In the implementation shown in FIG. 15, the tool 114 identifies that the track mode 308 associated with the "Workout" data item 858 is the YES/NO mode 312 and then generates a goal percentage 1510 for each performance time segment 1502 that reflects the average of the positive logical (e.g., "YES") log 116 data entries (not including the periods-to-exclude) corresponding to the respective time segment 1502 in relation to the weekly goal 408 associated with the "Workout" data item 858. In the implementation shown in FIG. 16, the tool 114 identifies that the track mode 308 associated with the "Workout" data item 858 is the YES/NO mode 312 and then generates a goal percentage 1610 for each performance time segment 1602 that reflects the average of the positive logical (e.g., "YES") log 116 data entries (not including the periods-to-exclude) corresponding to the respective time segment 1602 in relation to the monthly goal 410 associated with the "Workout" data item 858. In the implementation shown in FIG. 17, the tool 114 identifies that the track mode 308 associated with the "Workout" data item 858 is the YES/NO mode 312 and then generates a goal percentage 1710 for each performance time segment 1702 that reflects the average of the positive logical (e.g., "YES") log 116 data entries (not including the periods-to-exclude) corresponding to the respective time segment 1702 in relation to the quarterly goal 412 associated with the "Workout" data item 858. In the implementation shown in FIG. 18, the tool 114 identifies that the track mode 308 associated with the "Workout" data item 858 is the YES/NO mode 312 and then generates a goal percentage 1810 for each performance time segment 1802 that reflects the average of the positive logical (e.g., "YES") log 116 data entries (not including the periods-to-exclude) corresponding to the respective time segment 1802 in relation to the respective yearly goal 414 associated with the "Workout" data item 858. In this implementation, each performance time segment 1802 corresponds to a separate year and the tool 114 allows the user to identify a separate yearly goal (as well as a separate daily goal 406, weekly goal 408, monthly goal 410, and quarterly goal 412) for each year of log 116 data entries for the "Workout" data item 858.

In the implementation shown in FIG. 19, the tool 114 identifies that the track mode 308 associated with the "Weight" data item 856 is the AVERAGE mode 314 and then generates a goal percentage 1910 that reflects the average of the log 116 data entries (not including the periods-to-exclude) in relation to the Average goal 504 associated with the "Weight" data item 856. In the implementation shown in FIG. 20, the tool 114 identifies that the track mode 308 associated with the "Weight" data item 856 is the AVERAGE mode 314 and then generates a goal percentage 2010 for each performance time segment 2002 that reflects the average of the log 116 data entries (not including the periods-to-exclude) corresponding to the respective time segment 2008 in relation to the Average goal 504 associated with the "Weight" data item 856. In the implementation shown in FIG. 21, the tool 114 identifies that the track mode 308 associated with the "Weight" data item 856 is the AVERAGE mode 314 and then generates a goal percentage 2110 for each performance time segment 2102 that reflects the average of the log 116 data entries (not including the periods-to-exclude) corresponding to the respective time segment 2108 in relation to the Average goal 504 associated with the "Weight" data item 856. In the implementation shown in FIG. 22, the tool 114 identifies that the track mode 308 associated with the "Weight" data item 856 is the AVERAGE mode 314 and then generates a goal percentage 2210 for each performance time segment 2202 that reflects the average of the log 116 data entries (not including the periods-to-exclude) corresponding to the respective time segment 2208 in relation to Average goal 504 associated with the "Weight" data item 856. In the implementation shown in FIG. 23, the tool 114 identifies that the track mode 308 associated with the "Weight" data item 856 is the AVERAGE mode 314 and then generates a goal percentage 2310 for each performance time segment 2302 that reflects the average of the log 116 data entries (not including the periods-to-exclude) corresponding to the respective time segment 2308 in relation to the respective Average goal 504 associated with the "Weight" data item 856. In this implementation, each performance time segment 2302 corresponds to a separate year and the tool 114 allows the user to identify a separate yearly goal 504 for each year of log 116 data entries for the "Weight" data item 856.

Referring back to FIG. 2E, the tool 114 next displays the performance of the data item in relation to the goal. (Step 284). As shown in FIGS. 9-10 and 12-23, the tool 114 displays the goal percentage 918, 1010, 1210, 1310, 1410, 1510, 1610, 1710, 1810, 1910, 2010, 2110, 2210, and 2310 in association with the respective performance time segment.

After displaying the performance of the data item in relation to the goal or if a goal is not associated with the performance time segment, the tool 114 continues processing at step 270. If the tool 114 determines that a request has not been received to determine the performance of the data item, the tool 114 ends processing.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A method in a data processing system stored in a non-transitory computer readable memory to permit the data processing system to perform the steps comprising: receiving an identification of any user defined data item and not limited to data items defined by the data processing system; associating the data item with one of three tracking modes, the three tracking modes being a LOGICAL mode where a user records whether a data item occurred or not, a SUM mode where the user records a total number of times a data item occurred, and an AVERAGE mode where the user records a numerical level for an item; receiving a goal corresponding to the data item; and determining the performance of the data item in relation to the goal based on the associated one tracking mode when the steps are executed by the data processing system.

2. The method of claim 1, further comprising the step of receiving a period-to-exclude, wherein the performance of the data item is determined in relation to the goal based on the associated one tracking mode and the period-to-exclude.

3. The method of claim 2, wherein the period-to-exclude corresponds to a calendar date.

4. The method of claim 2, wherein the period-to-exclude corresponds to a calendar day to regularly exclude.

5. The method of claim 1, wherein the one tracking mode is a LOGICAL mode and the performance of the data item reflects a number of positive logical entries associated with the data item in a performance time segment in relation to the goal.

6. The method of claim 1, wherein the one tracking mode is a SUM mode and the performance of the data item reflects a total of a plurality of data entries associated with the data item in a performance time segment in relation to the goal.

7. The method of claim 1, wherein the one tracking mode is an AVERAGE mode and the performance of the data item reflects an average of a plurality of data entries associated with the data item in a performance time segment in relation to the goal.

8. The method of claim 1, wherein the step of receiving a goal comprises the step of receiving a plurality of goals, the plurality of goals including at least one of a Daily goal, a Weekly goal, a Monthly Goal, a Quarterly Goal, and a Yearly Goal.

9. The method of claim 8, wherein the step of determining the performance of the data item in relation to the goal comprises the steps of: receiving a performance time segment; determining whether the performance time segment corresponds to one of the plurality of goals; and determining the performance of the data item in relation to the goal based on the associated one tracking mode in response to determining that the performance time segment corresponds to the one of the plurality of goals.

10. The method of claim 1, further comprising the steps of: receiving an identification of another data item that is unrelated to the first data item; associating the other data item with a different one of the plurality of tracking modes; displaying a plurality of log entries associated with the first data item for a predefined period to reflect the one of the plurality of tracking modes while displaying a corresponding plurality of log entries associated with the second data item to reflect the different one of the plurality of tracking modes.

11. The method of claim 1, wherein the data item is one of a plurality of data items having one of a plurality of tracking modes and further comprising the steps of: creating a log; and storing each data item in the log in accordance with the respective one of the plurality of track modes of the data item.

12. A method in a data processing system stored in a non-transitory computer readable memory to permit the data processing system to perform the steps comprising: receiving an identification of any user defined data item and not limited to data items defined by the data processing system; associating the data item with one of three tracking modes, the three tracking modes being a LOGICAL mode where a user records whether a data item occurred or not, a SUM mode where the user records a total number of times a data item occurred, and an AVERAGE mode where the user records a numerical level for an item; and determining the performance of the data item based on the associated one tracking mode when the steps are executed by the data processing system.

13. The method of claim 12, wherein the one tracking mode is a LOGICAL mode and the performance of the data item reflects a number of positive logical entries associated with the data item in a performance time segment.

14. The method of claim 12, wherein the one tracking mode is a SUM mode and the performance of the data item reflects a total of a plurality of data entries associated with the data item in a performance time segment.

15. The method of claim 12, wherein the one tracking mode is an AVERAGE mode and the performance of the data item reflects an average of a plurality of data entries associated with the data item in a performance time segment.

16. The method of claim 12, wherein the performance of the data item based on the associated one tracking mode is determined for each of a plurality of performance time segments, the plurality of performance time segments corresponding to a predefined period.

17. The method of claim 16, further comprising the steps of: receiving a period-to-exclude; receiving the performance time segment; and displaying the performance of the data item for each performance time segment concurrently with the period-to-exclude.

18. The method of claim 17, wherein the performance of the data item for each performance time segment is determined on the associated one tracking mode and the period-to-exclude.

19. The method of claim 12, further comprising the steps of: receiving a log entry; determining if the log entry corresponds to the one tracking mode associated with the data item and associating the log entry with the data item when it is determined that the log entry corresponds to the one tracking mode associated with the data item.

20. A non-transitory machine-readable medium containing instructions for controlling a data processing system to perform a method, the method comprising: receiving an identification of any user defined data item and not limited to data items defined by the data processing system; associating the data item with one of three tracking modes, the three tracking modes being a LOGICAL mode where a user records whether a data item occurred or not, a SUM mode where the user records a total number of times a data item occurred, and an AVERAGE mode where the user records a numerical level for an item; receiving a goal corresponding to the data item; and determining the performance of the data item in relation to the goal based on the associated one tracking mode when the instructions are executed by the data processing system.

21. The machine-readable medium of claim 20, wherein the method further comprises the step of receiving a period-to-exclude, and the performance of the data item is determined in relation to the goal based on the associated one tracking mode and the period-to-exclude.

22. The machine-readable medium of claim 20, wherein the one tracking mode is a LOGICAL mode and the performance of the data item reflects a number of positive logical entries associated with the data item in a performance time segment in relation to the goal.

23. The machine-readable medium of claim 20, wherein the one tracking mode is a SUM mode and the performance of the data item reflects a total of a plurality of data entries associated with the data item in a performance time segment in relation to the goal.

24. The machine-readable medium of claim 20, wherein the one tracking mode is an AVERAGE mode and the performance of the data item reflects an average of a plurality of data entries associated with the data item in a performance time segment in relation to the goal.

25. The machine-readable medium of claim 20, wherein the step of receiving a goal comprises the step of receiving a plurality of goals, the plurality of goals including at least two of a Daily goal, a Weekly goal, a Monthly Goal, and a Yearly Goal.

26. The machine-readable medium of claim 25, wherein the step of determining the performance of the data item in relation to the goal comprises the steps of: receiving a performance time segment; determining whether the performance time segment corresponds to one of the plurality of goals; and determining the performance of the data item in relation to the goal based on the associated one tracking mode in response to determining that the performance time segment corresponds to the one of the plurality of goals.

27. The machine-readable medium of claim 20, wherein the method further comprises the steps of: receiving an identification of another data item; associating the other data item with a different one of the plurality of tracking modes; and displaying a plurality of log entries associated with the data item for a predefined period to reflect the one of the plurality of tracking modes and a corresponding plurality of log entries associated with the other data item to reflect the different one of the plurality of tracking modes.

28. A non-transitory machine-readable medium containing instructions for controlling a data processing system to perform a method, the method comprising: receiving an identification of any user defined data item and not limited to data items defined by the data processing system; associating the data item with one of three tracking modes, the three tracking modes being a LOGICAL mode where a user records whether a data item occurred or not, a SUM mode where the user records a total number of times a data item occurred, and an AVERAGE mode where the user records a numerical level for an item; determining the performance of the data item based on the associated one tracking mode when the steps are executed by the data processing system.

29. The machine-readable medium of claim 28, wherein the one tracking mode is a LOGICAL mode and the performance of the data item reflects a number of positive logical entries associated with the data item in a performance time segment.

30. The machine-readable medium of claim 28, wherein the one tracking mode is a SUM mode and the performance of the data item reflects a total of a plurality of data entries associated with the data item in a performance time segment.

31. The machine-readable medium of claim 28, wherein the one tracking mode is an AVERAGE mode and the performance of the data item reflects an average of a plurality of data entries associated with the data item in a performance time segment.

32. The machine-readable medium of claim 28, wherein the performance of the data item based on the associated one tracking mode is determined for each of a plurality of performance time segments, the plurality of performance time segments corresponding to a predefined period.

33. The machine-readable medium of claim 28, wherein the method further comprises the steps of: receiving a period-to-exclude; receiving the performance time segment; and displaying the performance of the data item for each performance time segment concurrently with the period-to-exclude.

34. The machine-readable medium of claim 33, wherein the performance of the data item for each performance time segment is determined on the associated one tracking mode and the period-to-exclude.

35. A data processing system, the data processing system comprising: a non-transitory memory device further comprising a performance tracking program that receives an identification of any user defined data item and not limited to data items defined by the data processing system, associates the data item with one of three tracking modes, the three tracking modes being a LOGICAL mode where a user records whether a data item occurred or not, a SUM mode where the user records a total number of times a data item occurred, and an AVERAGE mode where the user records a numerical level for an item, receives a goal corresponding to the data item, and determines the performance of the data item in relation to the goal based on the associated one tracking mode; and a processor that runs the performance tracking program.

36. The data processing system of claim 35, wherein the program further receives a period-to-exclude and determines the performance of the data item in relation to the goal based on the associated one tracking mode and the period-to-exclude.

37. The data processing system of claim 35, wherein the one tracking mode is a LOGICAL mode and the performance of the data item reflects a number of positive logical entries associated with the data item in a performance time segment in relation to the goal.

38. The data processing system of claim 35, wherein the one tracking mode is a SUM mode and the performance of the data item reflects a total of a plurality of data entries associated with the data item in a performance time segment in relation to the goal.

39. The data processing system of claim 35, wherein the one tracking mode is an AVERAGE mode and the performance of the data item reflects an average of a plurality of data entries associated with the data item in a performance time segment in relation to the goal.

40. The data processing system of claim 35, wherein when the program receives a goal, the program receives a plurality of goals, the plurality of goals including at least two of a Daily goal, a Weekly goal, a Monthly Goal, and a Yearly Goal.

41. The data processing system of claim 40, wherein when the program determines the performance of the data item in relation to the goal, the program receives a performance time segment; determines whether the performance time segment corresponds to one of the plurality of goals; and determines the performance of the data item in relation to the goal based on the associated one tracking mode in response to determining that the performance time segment corresponds to the one of the plurality of goals.

42. The data processing system of claim 41, further comprising the steps of: receiving an identification of another data item; associating the other data item with a different one of the plurality of tracking modes; and displaying a plurality of log entries associated with the data item for a predefined period to reflect the one of the plurality of tracking modes and a corresponding plurality of log entries associated with the other data item to reflect the different one of the plurality of tracking modes.

43. A data processing system comprising: means for receiving an identification of any user defined data item and not limited to data items defined by the data processing system; means for associating the data item with one of a three tracking modes, the three tracking modes being a LOGICAL mode where a user records whether a data item occurred or not, a SUM mode where the user records a total number of times a data item occurred, and an AVERAGE mode where the user records a numerical level for an item; and means for determining the performance of the data item in a performance time segment based on the associated one tracking mode.

44. The data processing system of claim 43, wherein the one tracking mode is a LOGICAL mode and the performance of the data item reflects a number of positive logical entries associated with the data item in the performance time segment.

45. The data processing system of claim 43, wherein the one tracking mode is a SUM mode and the performance of the data item reflects a total of a plurality of data entries associated with the data item in the performance time segment.

46. The data processing system of claim 43, wherein the one tracking mode is an AVERAGE mode and the performance of the data item reflects an average of a plurality of data entries associated with the data item in the performance time segment.

47. The data processing system of claim 43, further comprising means for receiving a goal, wherein the means for determining the performance of the data item includes means for determining and displaying the performance of the data item for the performance time segment in relation to the goal.

\* \* \* \* \*